(No Model.)
H. MEREWEATHER.
BUNDLING MACHINE.
No. 301,064. Patented June 24, 1884.
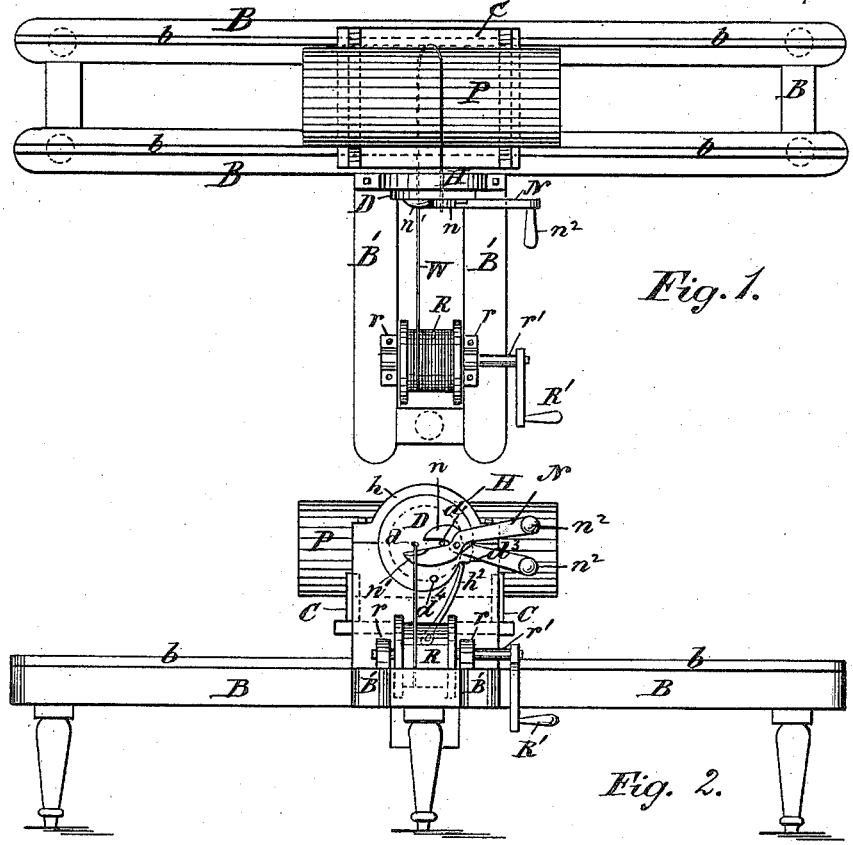
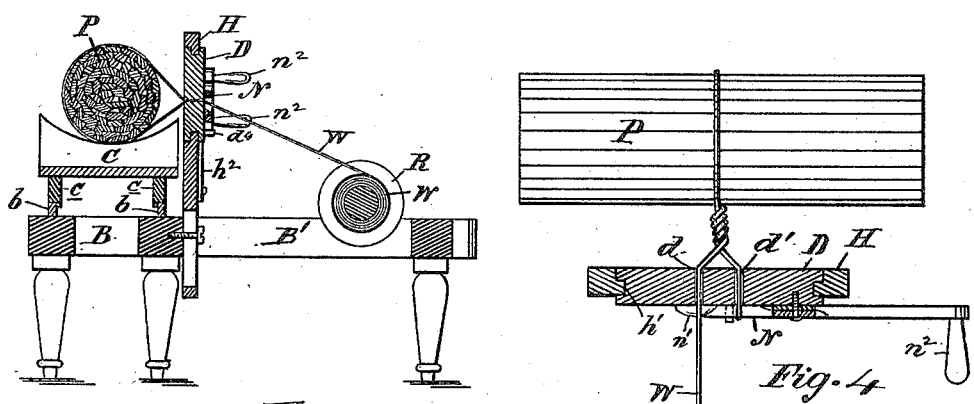
Witnesses:
John Grist
R. P. King
Inventor:
Henery Mereweather
By Henry Grist
Att'y

UNITED STATES PATENT OFFICE.

HENERY MEREWEATHER, OF HULL, QUEBEC, CANADA.

BUNDLING-MACHINE.

SPECIFICATION forming part of Letters Patent No. 301,064, dated June 24, 1884.

Application filed February 11, 1884. (No model.)

*To all whom it may concern:*

Be it known that I, HENERY MEREWEATHER, of Hull, in the Province of Quebec, in the Dominion of Canada, have invented new and useful Improvements in Machines for Tying Packages with Wire; and I hereby declare the following to be a full, clear, and exact description of the same.

The object of my invention is the construction of a machine for tying bundles and packages with wire—i. e., a machine which provides facilities for passing the wire around the package by hand for tightening the same by turning the wire-reel, then twisting or binding it by turning the chuck, and finally, for cutting off the wire.

My new machine consists, mainly, of a bench for carrying a cradle or cradles holding the united packages, a side extension of said bench to support the wire-reel, and a head-stock with chuck and nippers secured to the side of the bench.

Figure 1 is a top view of my new machine; Fig. 2, an elevation showing the head-stock. Fig. 3 is a cross-section through the head-stock. Fig. 4 is an enlarged detail, showing the twisting of the wire effected by turning the chuck.

B is the bed or bench, consisting of an ordinary frame upon legs, and provided with the runners $b$; and B' is a side extension of the bench upon which the wire-reel is journaled.

C is the cradle to hold a bundle or package for tying, and provided with grooved guides $c$ to slides upon the rails $b$; or the cradle may be provided with wheels, or fitted in any suitable manner.

R is the reel, upon which is tightly coiled the wire intended to be used for tying the packages. It is journaled in suitable bearings, $r$, placed nearly at the extremity of the side bench, B', and the axle $r$ is provided with a crank-handle, R'.

H is the head-stock secured to the side of the bench B at the junction of the extension B'.

D is a disk or chuck having two perforations, $d$ $d'$—one at each side of the center, and carrying the cutting-nippers N. The chuck D is free to rotate in the head-stock H in one direction, and is retained therein laterally by a key, $h'$, formed in the cap $h$ of the head-stock and a corresponding keyway or peripheral groove in the chuck, or in any other known and suitable manner. The chuck D is prevented from rotating in the opposite direction by a spring pawl or catch, $h^2$, secured to the head-stock, and engaging a notch, $d^3$, in the chuck. The nippers N are pivoted eccentrically upon the face of the chuck D, and have nipping-jaw $n$, and a cutting-point, $n'$, a pin or stop, $d^4$, limiting the rotation of the nippers upon the chuck in the direction in which the chuck is formed to such a position that the nipping-jaw $n$ is over the near perforation $d'$, and the cutting-point $n'$, under the perforation $d$, free to sweep across said perforation and cut off the wire held in the same. The nippers are provided with cranked handles $n^2$, to serve as a turning-crank to the chuck, the back edge of the nippers pressing against the pin $d^4$, which is placed eccentrically upon the chuck.

P is a bundle or package to be tied, and resting upon the cradle C.

W is the wire coiled tightly upon the reel R, and the free end passed through the perforation $d$ in the chuck D, then around the package P, and back through the chuck D by the perforation $d'$, the end being held in the jaws $n$ of the nippers N, the handles $n^2$ being pressed together. The reel R is now turned backward, winding up any slack wire, and tightening the same upon and around the package P, the latter being drawn close to the head-stock. When sufficiently tightened, the chuck D is turned several revolutions from right to left, thus twisting together the wire between the head-stock H and the package P, and when sufficiently twisted and secured the nippers are turned at once in the opposite direction, the chuck being then caught by the catch $h'$ in the notch $d^3$ and held in that position, the cutting-edge $n'$ of the nippers sweeping across the perforation $d$, and cutting off the wire, thus completing the operation.

I claim as my invention—

The combination of a bench, B, supporting a stool or cradle, C, holding a package to be tied, a laterally-extending portion, B', having journaled upon it a wire-reel, R, provided with crank, and a head-stock, H, having a disk or chuck bodily journaled therein, said chuck having two perforations—one at each side of the center—for the wire to pass through, and having eccentrically pivoted upon its face the nippers N, provided with nipping-jaw and cutting-edge sweeping said perforations, and serving as a crank to turn the said chuck in one direction for twisting the wire and to cut off the same when turned in the opposite direction, the chuck being held stationary by a catch, $h^2$, engaging a suitable notch, all substantially as shown and described, and for the purpose set forth.

Signed at Ottawa this 30th day of January, 1884.

HENERY MEREWEATHER.

In the presence of—
A. HARVEY,
JOHN GRIST.